Figure 1:
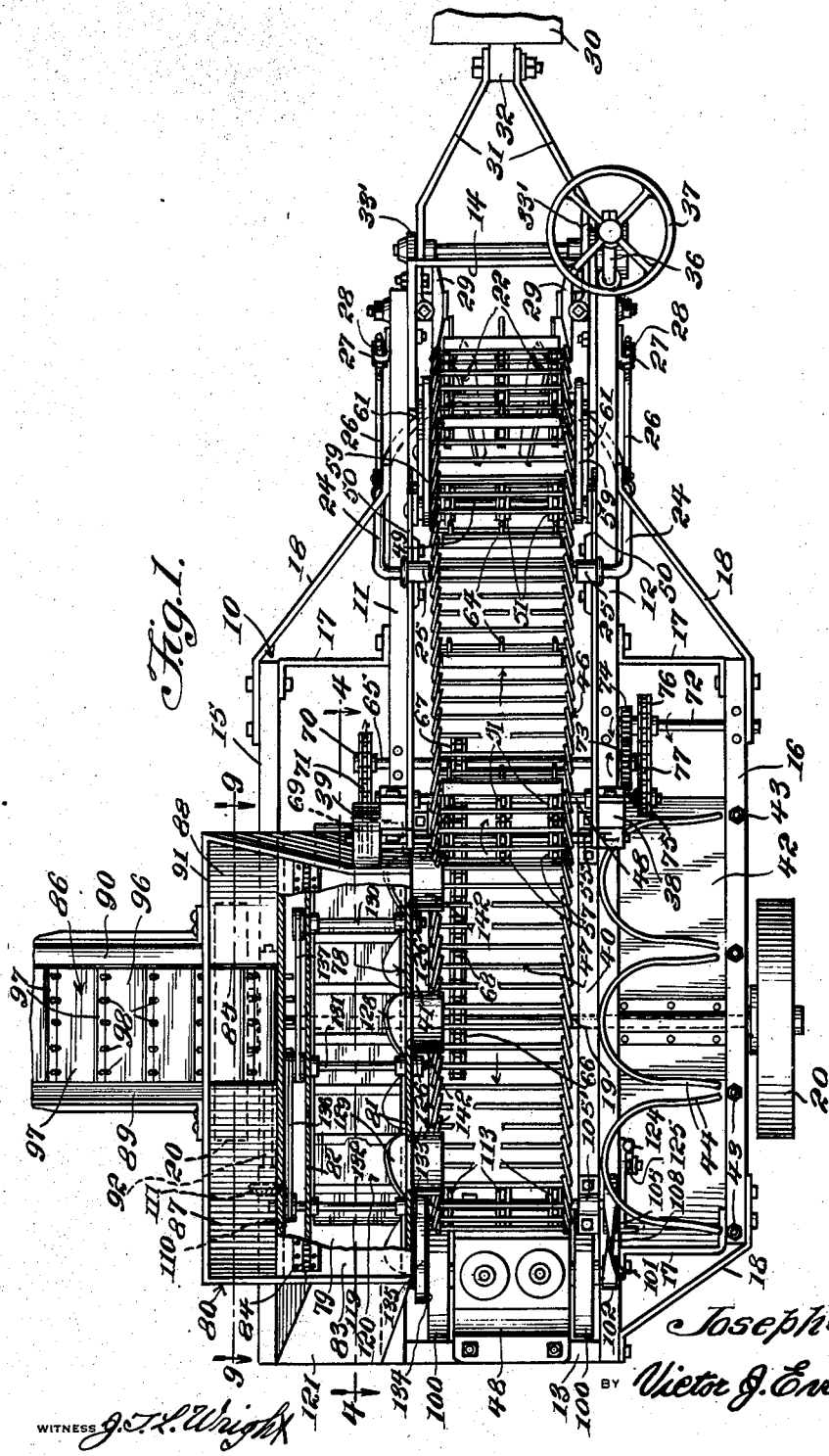

June 23, 1942.

J. S. ALBIN 2,287,367

SUGAR BEET MACHINE

Filed June 8, 1940

4 Sheets-Sheet 1

Joseph S. Albin
INVENTOR

BY Victor J. Evans & Co.
ATTORNEYS

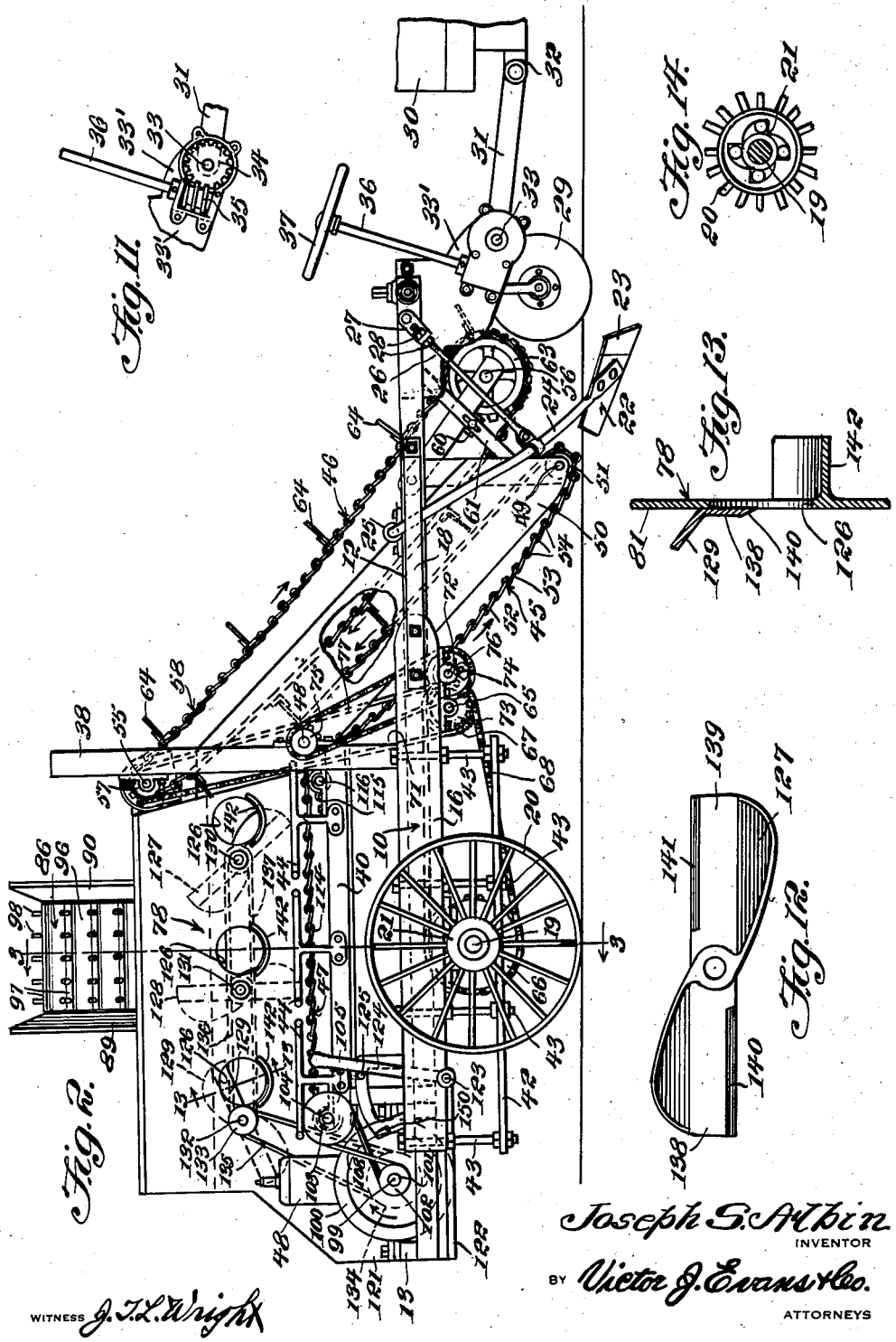

June 23, 1942.   J. S. ALBIN   2,287,367
SUGAR BEET MACHINE
Filed June 8, 1940   4 Sheets-Sheet 3
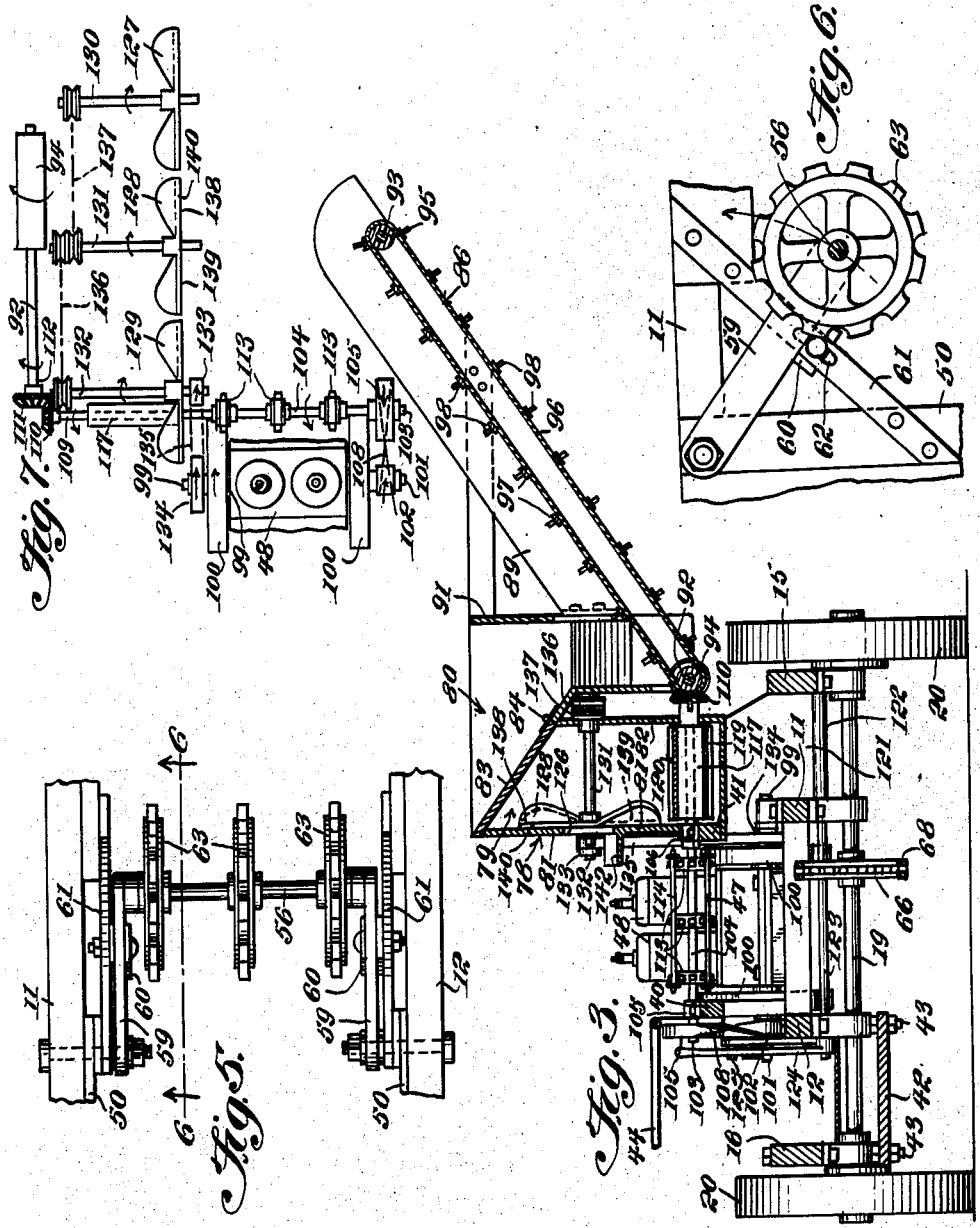

June 23, 1942.                J. S. ALBIN                    2,287,367
                           SUGAR BEET MACHINE
                           Filed June 8, 1940          4 Sheets-Sheet 4
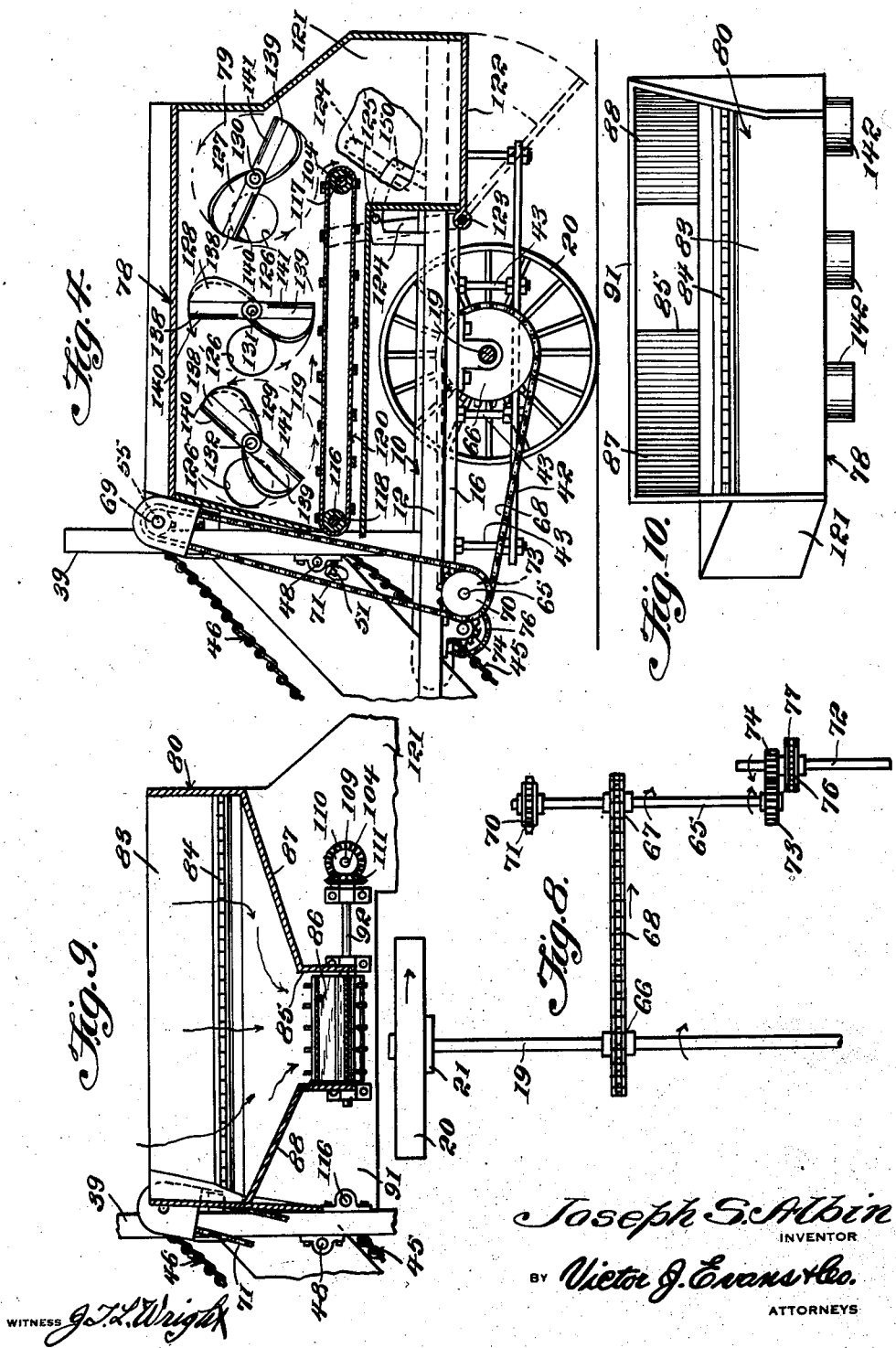
Joseph S. Albin
INVENTOR
BY Victor J. Evans & Co.
ATTORNEYS
WITNESS J. T. L. Wright Patented June 23, 1942

2,287,367

UNITED STATES PATENT OFFICE 2,287,367

SUGAR BEET MACHINE

Joseph S. Albin, Prosser, Wash.

Application June 8, 1940, Serial No. 339,563

8 Claims. (Cl. 55—9)

My invention relates to new and useful improvements in beet harvesting and topping machines.

An important object of my invention is to provide a beet harvesting and topping machine that is adapted to remove beets from the ground as the machine moves forward and that includes a conveyer means to carry the beets to a platform disposed adjacent a topping device, which platform is uniquely arranged on the machine to permit several operators to be stationed therealong to feed the beets to the said topping device.

Another object of my invention is to provide a beet harvesting and topping machine of the above-mentioned character wherein the various parts of the device are uniquely arranged and corelated to permit the above operations to be conducted in an efficient and expeditious manner, and that permits the toppers to perform their duties with a minimum expenditure of time and effort.

Still another object of my invention is the provision of a beet harvesting and topping machine of the above-mentioned character wherein the means for carrying the beets from the diggers to the platform is uniquely constructed to remove the soil adhering to the beets before the same are delivered onto the platform, and which permits the soil thus removed to fall back to the ground.

Yet another object of my invention is to provide a beet harvesting and topping machine of the above-mentioned character wherein all of the operations, except the positioning of the beets for the topping operations, are mechanical and substantially automatic in their action.

Other objects and advantages of my invention, will be apparent during the course of the following description.

In the drawings, forming a part of this specification, and wherein like numerals are employed to designate like parts throughout the same, Figure 1 is a top plan view of a device embodying my invention, Figure 2 is a side elevation thereof, Figure 3 is a vertical sectional view taken on the line 3—3 of Figure 2, Figure 4 is a fragmentary, longitudinal sectional view taken on the line 4—4 of Figure 1, Figure 5 is a fragmentary plan view illustrating the manner in which the lower end of the upper of the spaced conveyers is adjustably associated with the frame, Figure 6 is a vertical sectional view taken on the line 6—6 of Figure 5, Figure 7 is a fragmentary plan view illustrating the driving means for the motor driven conveyers embodying a part of my invention, Figure 8 is a top plan view illustrating the driving means for the traction driven conveyers embodying a part of my invention, Figure 9 is a fragmentary vertical sectional view taken on the line 9—9 of Figure 1, Figure 10 is a top plan view of the beet topping receptacle, Figure 11 is a fragmentary sectional view illustrating the means for lifting the forward part of the frame, Figure 12 is a rear elevation of one of the fan blades embodying a part of my invention, Figure 13 is a fragmentary vertical sectional view taken on the line 13—13 of Figure 2, and Figure 14 is a fragmentary sectional view of the overriding clutch incorporated in each of the traction wheel assemblies.

In the accompanying drawings, wherein for the purpose of illustration is shown a preferred embodiment of my invention, the numeral 10 designates a frame adapted to support the various appurtenances and adjuncts of the device. The frame includes spaced parallel longitudinally extending supporting bars 11 and 12 connected at their rearward and forward ends by the transverse bars 13 and 14. The bars 15 and 16 are spaced laterally of the bars 11 and 12 and the opposite ends thereof are connected thereto by the braces 17 and 18. The frame is supported from the ground by the essentially large traction wheels 20 which are mounted on the opposite ends of the transversely extending axle 19 laterally of the bars 15 and 16. As illustrated in Figure 14 each of the wheel hubs enclose an overriding clutch 21 which permits the wheels to rotate in a rearward direction independently of the axle but which effects a binding connection between the wheel and axle to cause the axle to rotate with the wheels when the frame is moved in a forward direction.

The device may be pulled in any suitable manner and the tractor, or other actuating means 30 is connected thereto by means of the drawbar 31. The drawbar normally holds the frame in substantially parallel relation with the ground, one end thereof being pivotally connected to the attaching lugs 32 of the tractor and the other end thereof being fixedly secured to the shaft 33 the opposite ends of which are journaled in the brackets 33' depending from the forward ends of the bars 11 and 12. The shaft 33 carries a circular gear 34 which meshes with the worm gear 35 of the shaft 36. The upper end of the shaft is provided with a hand wheel 37 by means of which the shaft may be manually rotated to impart clockwise or anti-clockwise rotation to the shaft 33. Rotation of the shaft 33 in a clockwise direction will cause the pivoted ends of the drawbar 31 to swing downwardly and to rotate about the pivots connecting the same to the attaching lugs of the tractor in a manner to raise the forward end of the frame. Conversely, rotation of the shaft in an anti-clockwise direction will effect an upward swinging of the drawbars to lower the forward end of the frame.

The harvester here illustrated is sufficiently large to carry three men who stand on the underslung platform 42 disposed at the rearward end of the frame between the bars 12 and 16. The men face toward the middle of the frame and have ready access to the elevated conveyer 47 which extends longitudinally of the frame between the bars 11 and 12. The topper 78 is arranged at the side of the conveyer remote from the men between the bars 11 and 15 and the side of the topper confronting the conveyer is provided with three openings 126 across which rapidly rotating knives are caused to move.

Means is provided at the forward end of the frame to dig the beets from the ground as the device moves forwardly. The conveyers 45 and 46 gather the beets as they are turned up by the diggers and deliver the same onto the conveyer 47 which runs between the men and the topper. Each of the men stationed on the platform 42 is thus provided with an adequate and continuous supply of beets, and as the conveyer 47 carries each of the beets in front of the men, the men pick them up and insert the tops thereof into one of the openings 126 so that the knives may sever the top from the body of the beet. The topper includes means, hereinafter described in detail, for disposing of the beet tops and a bin 80 is provided at the side of the topper remote from the men for receiving the topped beets. The conveyer 86 extends from the bin and carries the beets therein to a suitable vehicle traveling alongside the harvester.

The conveyers 45 and 46 are driven by the traction wheels 20 and, therefore, operate only when the device is moving forwardly; the topper and the conveyers 47 and 86 are, however, continuously driven by the motor 48. If more of the beets are delivered onto the conveyer 47 by the conveyers 45 and 46 than the men can conveniently dispose of, the harvester may be stopped until the men top the excess beets. The continuous operation of the topper and the conveyers 47 and 86 makes it unnecessary for the harvester to remain in motion in order for the topping operation to be performed.

The diggers or lifters 22 are mounted on the forward end of the frame and comprise similar shares 23 carried by the free ends of the U-shaped bracket 24 and arranged to travel at opposite sides of a row of beets. The middle portion of the bracket is pivotally secured to the bars 11 and 12 by the bearings 25 which permits swinging movement of the bracket arms in a vertical plane; however, adjustable means is provided to hold the bracket arms and shares in a selected position. A rod 26 is pivoted to the lower ends of each of the bracket arms and the other end of the rods extends through the brackets 27 to screw-threadedly receive the nuts 28, which nuts may be rotated thereon to vary the angle of the bracket arm relative to the frame and to adjust the bite of the shares into the ground. The hand wheel 37 may be manually rotated to raise or lower the discs 29 and the shares 23 in accordance with the nature of the ground and the size of the beets being removed therefrom. When it is desired to render the harvester inoperative, as when it is being moved to and from the beet field, the hand wheel may be turned sufficiently to raise the shares completely above the surface of the ground.

The discs 29 act to cut the ground surface in advance of the shares so that the ground may be easily broken by the shares, thus reducing the probability of damage to the beets in case the ground happens to have a hard top crust. The usual vertical adjustment and swivel movement of the disc knives is provided.

Spaced vertical uprights 38 and 39 are mounted on the bars 11 and 12 at the forward end of the topper 78 and the longitudinally extending bars 40 and 41 extend from the uprights 38 and 39 in vertically spaced relation with the bars 12 and 11. The underslung platform 42 is arranged between the bars 12 and 16 and is suspended therefrom by the supporting rods 43. As hereinbefore described, the platform is adapted to support several workers in close proximity to the topper in a manner whereby they will be properly situated to insert the beets in the topper openings 126. The travel of the frame over the beet fields is frequently rough and the equilibrium of the men standing on the platform 42 is exceedingly unsteady. I have, therefore, provided an essentially U-shaped supporting bracket 44 for each of the men standing on the platform which brackets are mounted on and extend outwardly from the bar 40 above the platform. The supporting brackets are adapted to embrace the waists of the men and the spaced arm portions thereof will offer substantial support to counteract the swaying and jostling of the harvester over the essentially rough terrain of the beet field.

The space between the intermediate bars 11 and 12 is occupied in progressive order from the forward to the rearward end thereof by the vertically spaced conveyers 45 and 46, the conveyer 47 and the internal combustion engine 48.

The spaced conveyers 45 and 46 are adapted to receive the beets as they are turned up by the shares 23 and to deliver the same onto the horizontal conveyer 47. The forward ends of the conveyers 45 and 46 are, therefore, arranged below the frame and adjacent the surface of the ground slightly rearwardly of the shares. The upper ends of the conveyers are arranged substantially above the frame and adjacent the top run of the horizontal conveyer 47. The lowermost conveyer 45 moves around the shafts 48 and 49, the shaft 48 being journaled on the uprights 38 and 39 and the shaft 49 being journaled between the lower ends of the webs 50 which depend from the bars 11 and 12. The portions of the shafts 48 and 49 extending between the bars 11 and 12 and the webs 50 are provided with spaced sprocket wheels 51 which engage with the endless belt 52. The belt comprises a plurality of circumferentially spaced rods or bars 54 the ends of which bars are bent in the same direction at right angles thereto and looped around the adjacent bar, as at 53. The bars engage between the teeth of the sprockets, whereby rotation of the sprockets will cause the upper and lower runs of the belt to move about the shafts 48 and 49.

The conveyer 46 is arranged in upwardly and rearwardly inclined parallel relation with the lower conveyer 45, the upper end thereof being supported by the shaft 55 and the lower end thereof being supported by the shaft 56. The shaft 55 is journaled to the uprights 38 and 39 and the portion thereof extending between the uprights is provided with spaced sprocket members 57 the teeth of which mesh with the rods of the conveyer belt 58. The lower shaft 56 is journaled to and extends between the lower ends of the arms 59, the upper ends of which arms are pivoted to the bars 11 and 12. The portion of the shaft 56 extending between the arms 59 is similarly provided with spaced sprockets 63 which mesh with the lower end of the belt. The arms 59 extend forwardly and downwardly from the frame, as best illustrated in Figure 6, and the intermediate portions thereof bear against the stop members 60 carried by the angularly arranged bars 61. The bars 61 are secured to the frame and to the webs 50 and the stops 60 are longitudinally movable relative thereto within limits defined by the slots 62, whereby the position of the shaft 56 may be raised or lowered to move the upper conveyer 46 toward or away from the lower conveyer 45. The belt 58 is pivoted at circumferentially spaced intervals therearound with pronged risers 64, each of which risers extends the full width of the belt and the prongs of each of the risers are sufficiently long to contact the upper run of the lower conveyer 45.

The shaft 65 is journaled to and extends transversely between the bars 11 and 12 slightly forwardly of the uprights 38 and 39. Sprockets 66 and 67 are fixedly secured to the axle 19 and shaft 65, respectively, and the endless chain 68 connects the sprockets, whereby rotation of the axle effected by forward movement of the harvester will impart similar rotation to the shaft 65. The shafts 55 and 65 extend beyond the upright 39 and bar 11, respectively, and the extending ends thereof carry the sprockets 69 and 70, whereby the endless chain 71 may be associated therewith to drive the shaft 55 in the same direction as the shaft 65. Rotation of the shaft 55 will cause the belt 58 of the upper conveyer 46 to rotate in a clockwise direction, whereby the lower run thereof will move from the lower sprockets 63 toward the upper sprockets 57. The movement of the conveyer 46 in the above manner will cause the prongs of the risers 64 to engage with the beets, as they are removed from the ground by the shares 23, and to push the same onto the upper run of the lower conveyer 45.

The lower conveyer is also driven from the shaft 65 but at a substantially greater speed than the upper conveyer. The shaft 72 is journaled for rotation between bars 12 and 16 and the shaft 65 extends slightly beyond the bar 12. The extending end of the shaft 65 carries the circular gear 73 which meshes with the circular gear 74 carried by the shaft 72. The relation and ratio between the gears 73 and 74 is such that the shaft 72 will be caused to rotate in the opposite direction and substantially faster than the shaft 65. The upper shaft 48 of the lower conveyer extends beyond the upright 38 and the extending end thereof carries the sprocket 75 which is connected to the sprocket 76 of the shaft 72 by the endless chain 77, whereby rotation of the shaft 72 in an anti-clockwise direction will cause the shaft 48 to be rotated in an anti-clockwise direction, and whereby the upper run of the conveyer 45 will be caused to move from the lower toward the upper sprockets 51.

It may thus be seen that the spaced conveyers 45 and 46 are both driven from the shaft 65 but that the lower conveyer is caused to rotate substantially faster by reason of the ratio between the gears 73 and 74. The upper run of the lower conveyer will, therefore, travel substantially faster than the lower run of the upper conveyer. As the risers 64 push the beets onto the upper run of the lower conveyer, the relatively fast movement of the lower conveyer will tend to carry the beets away from the risers but, because of the inclined position of the conveyers, the beets will be prevented by gravity from following the lower conveyer any substantial distance from the risers. A continual rolling and jostling of the beets will thus be effected, and the spacings between the rods which comprise the belts of the conveyers will permit the soil from the beets to fall therethrough and onto the ground therebelow. The jostling and agitation of the beets by the relatively fast movement of the lower conveyer will cause substantially all of the soil adhering to the beets to be removed therefrom before the same are delivered onto the horizontal conveyer 47.

The topper 78 is arranged between the bars 11 and 15 laterally of the horizontal conveyer and it extends from the uprights 38 and 39 to substantially the rearward end of the frame. The topper includes a beet top receiving compartment 79 and a beet receiving hopper 80. The compartment and hopper are arranged laterally of each other and extend the full length of the topper. The compartment 79 is provided with spaced vertical side walls 81 and 82, the wall 81 extending substantially above the conveyer 47 and the wall 82 extending thereabove but terminating substantially below the wall 81. The beet top compartment is closed by the panel 83 which is hingedly secured to the upper edge of the wall 82, as at 84, and the panel comprises the bottom panel of the hopper 80, thus separating the beet top receiving compartment from the hopper, as best illustrated in Figure 3.

The bottom of the hopper is formed with downwardly sloping panels 87 and 88 which direct the beets within the hopper into the opening 85 and onto the lower end of the transversely extending conveyer 86. Side plates 89 and 90 are bolted, or otherwise secured, to the outer wall 91 of the hopper, and extend outwardly and upwardly therefrom. The shaft 92 is journaled to the wall 91 and extends between the lower ends of the plates, and the shaft 93 is journaled between the outer ends of the plates. The portion of the shaft 92 extending across the opening 85 and the portion of the shaft 93 extending between the side plates carry rollers 94 and 95 which frictionally engage the endless belt 96 entrained thereover. The belt 96 comprises a flexible web of canvas or the like having a plurality of transverse sections 97 secured thereto, each of which sections is provided with projecting studs 98 which engage the beets and prevent the same from rolling back into the hopper when they have been directed onto the conveyer by the sloping bottom panels thereof.

The conveyer 86 is driven by the internal combustion engine 48 which is provided with a drive shaft 99 extending from its opposite sides, each of the extending ends being provided with a conventional flywheel 100. The shaft 104 extends transversely of the frame from the supporting bar 40 to the inner wall of the hopper 80 and is supported by a journal 105' mounted on the bar 40 and a journal 106 mounted on the bar 41. The end 101 of the engine drive shaft is provided with a pulley 102 and the extending end 103 of the shaft 104 is provided with a pulley 105. The drive shaft of the motor rotates in a clockwise direction in Figure 2 and the endless belt 108 connecting the pulleys 102 and 105 is twisted whereby the shaft 104 will be rotated in an anti-clockwise direction. The end 109 of the shaft 104 carries a beveled gear 110 which meshes with the beveled gear 111 carried by the end 112 of the shaft 92, whereby the shaft will be rotated in a clockwise direction to cause the upper run of the conveyer 86 to travel from the lower roller 94 toward the upper roller 95.

The portion of the shaft 104 extending between the bars 40 and 41 is provided with a plurality of spaced sprockets 113 which receive one end of the endless belt 114 of the conveyer 47. The shaft 116 is journaled to the bars 40 and 41 adjacent the uprights 38 and 39 which shaft extends from the bar 40 and through the beet top receiving compartment 79. The portion of the shaft 116 extending between the bars 40 and 41 carries a plurality of spaced sprockets 115 which mesh with and support the other end of the belt 114. Rotation of the shaft 104 in an anti-clockwise direction in Figure 2 will, therefore, cause the upper run of the conveyer 47 to travel toward the rearward end of the frame in a manner to carry the beets deposited thereon by the conveyers 45 and 46 toward the rear of the device and in front of the men stationed on the platform 42.

The portions of the shafts 104 and 116 which extend through the beet top receiving compartment 79 carry rollers 117 and 118 which receive the opposite ends of the endless belt 119 of the conveyer 120. By virtue of the fact that the belt 119 is driven by the shaft 104, the upper run thereof will be cause to travel toward the rearward end of the device thereby to carry the beet tops within the compartment 79 toward its rearward end and into the chamber 121, as illustrated in Figure 4.

The bottom of the chamber 121 is closed by a plate 122 fixedly connected to the shaft 123, which shaft extends transversely of the frame to a position above the platform 42 and the operating handle 124 is carried by the portion of the shaft extending above the platform. The handle is normally retained in a position to close the chamber by a pin 125, or the like. When the conveyer 120 has deposited a sufficient quantity of beet tops within the chamber to substantially fill the same, the man adjacent the handle may release the same from the keeper to pivot the plate 122 to the dotted line position of Figure 4, whereby the beet tops within the hopper may be deposited on the ground rearwardly of the device in a compact pile or stack. The beet tops may be later collected by separate means, if desired.

The wall 81 of the topper 79 is provided with spaced openings 126, each of which openings is arranged in front of one of the men positioned on the platform 42. The fans 127, 128 and 129 are carried by the shafts 130, 131 and 132, which shafts extend between the walls 81 and 82 of the compartment 79 slightly laterally of the openings 126. The shaft 132 extends beyond the wall 81, and the extending end carries the pulley 133, which pulley is connected to the pulley 134 of the engine drive shaft by the endless belt 135. The driven shaft 132 is connected to the shaft 131 by the endless belt 136 and the shaft 131 is connected to the shaft 130 by the endless belt 137.

Each of the fans includes a pair of diametrically opposed blades 138 and 139 the longitudinal edges 140 and 141 of which are beveled to define cutting edges. As clearly illustrated in Figures 12 and 13, the cutting edges of the blades face in opposite directions and the cutting edges are presented to the inner face of the wall 81 to move across their respective openings 126. Arcuately curved supports 142 project from the outer side of the wall 81 below each of the openings 126 to hold and support the beet when the top of the same is projected through the opening 126 and into the path of the rotating fan.

By positioning the openings 126 above the endless conveyer 47 and at the side of the conveyer remote from the platform 42, the operators standing on the platform may gather the beets from the platform without danger of contacting the cutting edges of the rotating fans. As the beets are delivered onto the conveyer 47 by the conveyers 45 and 46 they are carried toward the rear of the device and within easy reach of the men standing on the platform 42. The beets are picked from the conveyer and rested upon the supports 142, from which position the tops of the beets may be advanced into the openings 126 and into the path of the cutting edges 140 and 141 of the fans. The manner in which the cutting edges of the fans are directed in opposite directions will cause the cutting edges to always move downwardly across the openings 126 in a manner to prevent the juices from the beets from being thrown upwardly and into the faces of the men standing on the platform.

The openings 126 are preferably of a size to accommodate the largest of the beets; however, the peripheral edges thereof will be sufficiently close to the smaller beets to prevent the fingers of the operator from contacting the cutting edges of the fans. After the beet has been topped, the severed tops fall onto the conveyer 120 which carries the same into the chamber 121 and the operator then tosses the topped beet into the hopper 80. The sloping walls 83, 87 and 88, comprising the bottom of the hopper, will direct the beets onto the lower end of the conveyer 86 which extends a sufficient distance laterally of the frame so that the topped beets deposited thereon may be discharged into a truck or other vehicle traveling at the side of the harvester.

It may thus be seen that the conveyers 47, 120 and 86 are operated by the continuously running motor 48 and that the conveyers 45 and 46, which supply the beets to the conveyer 47, are operated by the traction wheels 20. The beets will, therefore, only be supplied to the conveyer 47 when the harvester is moved forwardly. The rough, jerky manner in which the wheels 20 roll over the surface of the ground will cause the movement of the conveyers 45 and 46 to be essentially uneven or jerky in a manner to additionally agitate the beets supported by the risers 64 and to assure a thorough removal of the soil adhering thereto before the beets are deposited onto the conveyer 47. If an excess of beets is deposited at any time upon the conveyer, the device may be stopped for a few moments until the operators have cleared the excess beets therefrom. The above operation is permitted by reason of the fact that the conveyers 47, 120 and 86 and the fans 127, 128 and 129 are continuously rotated regardless of whether or not the harvester is in motion.

It may thus be seen that the organization hereinabove described contemplates an arrangement whereby the beets may be removed from the ground and delivered to the endless conveyers 45 and 46, which conveyers are cooperatively associated with the digger in a manner to gather the beets and to convey the same onto the conveyer 47. The association of the conveyers 45 and 46 is such that soil adhering to the beets will be removed and permitted to fall back onto the ground during the travel of the beets along the ramp. Operators stationed on the platform 42 at one side of the conveyer 47 may gather the beets separately therefrom and feed the same through the openings 126 whereby the unnecessary top portion of the beet will be removed by the fans 127, 128 or 129. The top portions of the beets are conveyed to a suitable receptacle from which they may be easily and expeditiously ejected in small compact heaps and the topped beets are tossed into the hopper 80 and carried to a suitable vehicle by the conveyer 86.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. A beet harvesting and topping machine comprising a portable frame; an endless conveyer extending longitudinally of the frame and adapted to carry beets toward the rearward end thereof; a motor mounted on the frame and having a driving connection with the said conveyer; a beet topper arranged laterally of the conveyer; digger means arranged at the front of said frame to remove the beets from the ground; a traction operated drive means mounted on the frame; and upwardly and rearwardly inclined endless conveyers interposed between the digger means and the said first conveyer and having a driven connection with the said traction operated drive means, said last conveyers being adapted to receive the beets from the digger means and to deposit the same on the first conveyer, whereby operators positioned laterally of the said first conveyer and in front of the topper may pick the beets from the conveyer and feed the same into the said topper.

2. A beet harvesting and topping machine comprising a portable frame; an endless conveyer extending longitudinally of the frame and adapted to carry beets toward the rearward end thereof; forwardly and downwardly inclined digger members arranged at the forward end of the frame; a pair of cooperative spaced upper and lower conveyers extending from the diggers to the said first conveyer and being so arranged with relation to each other that the upper conveyer immediately overlies the entire length of the lower conveyer; a plurality of circumferentially spaced riser elements carried by the upper of the spaced conveyers adapted to gather the beets from the digger members and to push the same onto the lower conveyer; a drive means operatively connected with each of the spaced conveyers and adapted to move the lower conveyer substantially faster than the upper conveyer, whereby longitudinal movement of the said spaced conveyers will move the beets from the diggers and onto the said first conveyer, and whereby the faster travel of the lower of the spaced conveyers will agitate the beets to remove soil therefrom.

3. A beet harvesting and topping machine comprising a frame; an axle journaled on the frame; traction wheels mounted on the axle; an endless conveyer extending longitudinally of the frame and adapted to carry beets toward the rearward end thereof; a motor mounted on the frame and having a driving connection with the said conveyer; digger means mounted on the frame forwardly of the conveyer; a pair of vertically spaced conveyers extending from the diggers to the said first conveyer, the upper of the spaced conveyers extending forwardly of the lower conveyer and in closer proximity to the digger means, both of said spaced conveyers being operatively connected with the axle whereby to be actuated only when the said axle is rotated and in a manner whereby the lower conveyer is caused to travel substantially faster than the upper of the said conveyers; a plurality of circumferentially spaced sets of prongs carried by the upper of the spaced conveyers, each of the sets of prongs extending the full width of the lower conveyer and each of the prongs being of sufficient length to contact the lower conveyer, whereby actuation of the spaced conveyers will cause the sets of prongs to sweep the beets from the digger means and onto the lower conveyer and movement of the beets between the said spaced conveyers from the digger member to the first conveyer by the sets of prongs will permit the faster travel of the lower conveyer to agitate the beets to remove soil therefrom.

4. A beet topper comprising the combination of a portable frame; an elevated conveyer mounted on the frame; a conveyer mounted on the frame forwardly of the elevated conveyer for carrying beets onto the said elevated conveyer; a transversely arranged conveyer mounted on the frame laterally of the first conveyer; a receptacle interposed between the first conveyer and the transversely arranged conveyer, said receptacle being divided into a beet receiving compartment and a beet top receiving compartment, the said beet receiving compartment receiving the lower end of the transverse conveyer and the top receiving compartment having a vertical wall arranged at one side of the first conveyer, the said wall being provided with laterally spaced openings disposed above the top surface of the first conveyer; a rotatable fan for each of the openings mounted within the beet top receiving compartment adjacent the said vertical wall, the blades of the fans being formed with a cutting edge adapted to move across the said openings for removing beet tops inserted through the openings; and a conveyer within the beet top receiving compartment for carrying the several beet tops therefrom.

5. A beet topper comprising the combination of a portable frame; a traction drive means supporting the frame; an elevated platform mounted on the frame; a conveyer mounted on the frame forwardly of the platform for delivering beets onto the said platform, said conveyer being connected with the traction drive of the frame in a manner to be rendered operative upon forward movement of the frame; a receptacle mounted on the frame laterally of the platform, said receptacle having a vertical wall extending above the platform and said wall being provided with laterally spaced openings disposed above the top surface of the platform; a rotatable fan for each of the openings mounted within the receptacle adjacent the said vertical wall, the blades of the fans being formed with a cutting edge adapted to move across the said openings for removing beet tops inserted through the openings; means independent of the traction drive means to continuously rotate the knives, whereby the knives will be operative when the frame is stationary; and a conveyer operatively connected with the said knife actuating means arranged laterally of the receptacle and extending transversely of the frame adapted to receive the topped beets and to move the same to a position laterally of the frame.

6. A beet harvesting and topping machine comprising a frame; an axle journaled on the frame; traction wheels mounted on the axle; an endless conveyer extending longitudinally of the frame and adapted to carry beets toward the rearward end thereof, the said conveyer being spaced inwardly from one side of the frame to define working stations; digger members mounted on the frame forwardly of the conveyer; a pair of vertically spaced conveyers extending from the diggers to the said first conveyer, the upper of the spaced conveyers extending forwardly of the lower conveyer and in closer proximity to the digger means, said spaced conveyers being operatively connected with the axle in a manner whereby the lower conveyer is caused to travel substantially faster than the upper of the said conveyers; a plurality of circumferentially spaced sets of prongs carried by the upper of the spaced conveyers, each of the sets of prongs extending the full width of the lower conveyer and each of the prongs being of sufficient length to contact the lower conveyer, whereby actuation of the spaced conveyers will cause the sets of prongs to sweep the beets from the digger means and onto the lower conveyer and movement of the beets between the said spaced conveyers from the digger members to the first conveyer by the sets of prongs will permit the faster travel of the lower conveyer to agitate the beets to remove soil therefrom; a receptacle mounted on the frame at the side of the first conveyer, remote from the working stations, said receptacle having a vertical wall extending above the first conveyer, which wall is provided with laterally spaced openings disposed above the top surface of the conveyer; a rotatable fan for each of the openings mounted within the receptacle adjacent the said vertical wall, the blades of the fans being formed with a cutting edge adapted to move across the said openings for removing beet tops inserted through the openings by operators occupying the said working stations.

7. In a beet harvesting and topping machine, as a subcombination, a pair of vertically spaced endless conveyers arranged in such relation with each other that the lower run of the upper conveyer extends in slight equi-spaced relation with the upper run of the lower conveyer; a plurality of circumferentially spaced riser elements carried by the upper of the spaced conveyers adapted to gather the beets and to push the same onto the lower conveyer; a drive means operatively connected with each of the spaced conveyers and adapted to move the lower conveyer substantially faster than the upper conveyer, whereby longitudinal movement of the said spaced conveyers will move the beets from the diggers, and whereby the faster travel of the lower of the spaced conveyers will agitate the beets to remove soil therefrom.

8. In a beet harvesting and topping machine, as a subcombination, a pair of obliquely arranged, vertically spaced endless conveyers, the lower run of the upper conveyer being arranged in slight equi-spaced relation with the upper run of the lower conveyer; drive means operatively connected with each of the conveyers in a manner whereby the lower conveyer is caused to travel substantially faster than the upper of the said conveyers; a plurality of circumferentially spaced sets of prongs carried by the upper of the spaced conveyers, each of the sets of prongs extending the full width of the lower conveyer and each of the prongs being of sufficient length to contact the lower conveyer, whereby actuation of the spaced conveyers will cause the sets of prongs to sweep the beets onto the lower conveyer, the faster travel of the lower conveyer acting to agitate the beets against the prongs and conveyers during the entire travel of the same along the said lower conveyer to remove soil therefrom.

JOSEPH S. ALBIN.